Patented Apr. 25, 1939

2,155,704

UNITED STATES PATENT OFFICE 2,155,704

STABILIZATION OF PER COMPOUNDS

Arthur Watson Goodall and Oswald Hugh Walters, Runcorn, England, assignors to Imperial Chemical Industries Limited, a corporation of Great Britain No Drawing. Application October 28, 1936, Serial No. 108,094. In Great Britain November 4, 1935

3 Claims. (Cl. 23—251)

This invention relates to improvements in the stabilization of substances generally known in the art as per compounds. This class includes hydrogen peroxide and those substances which will yield hydrogen peroxide either by treatment with water or when treated with an acid.

It is well known that aqueous solutions of per compounds such as sodium perborate tend to decompose on standing, even at low concentrations, with evolution of oxygen and consequent loss of oxidizing power. Many methods have been proposed for effecting the stabilization of such solutions by the addition of a soluble material. For many purposes the addition of such soluble foreign material to the solution has obvious objectionable features.

The object of this invention is to disclose a new way of stabilizing per compounds. A further object is to disclose a new way of stabilizing per compounds without the addition of any soluble material. A further object is to disclose a new way of stabilizing per compounds without affecting the use of these compounds or impairing the purity of the solutions thereof. A further object is to disclose a new way of stabilizing per compounds whereby the stabilizer is not consumed in the process but can be used again to stabilize further batches of per compounds. A further object is to disclose means of stabilizing per compounds whereby the stabilizer can be regenerated for further use. Further objects will be disclosed or apparent in the following description.

These objects are attained by treating the per compound with silica gel or one of its recognized equivalents in the art, for instance, the gels derived from oxides of aluminium, thorium, zirconium, nickel and titanium.

The treatment may be effected in any convenient manner, for example, in the case of a solid such as sodium perborate the gel may be merely mixed with the solid in any suitable device. On the subsequent use of such mixtures for the preparation of solutions the gel remains undissolved and may readily be separated from the stable solution.

In further methods a solution of the per compound may be treated, for example, by being merely left standing in contact with the granular gel for some time and then decanted, or it may be agitated intermittently or continuously with the gel and filtered, or may be merely filtered through a bed of the gel.

The same batch of gel can be used for the successive treatment of many batches of solution, but as the efficacy appears to diminish somewhat with repeated use, we find that in order to attain the same degree of stabilization in the later batches of solution, an extended time of contact between the gel and the solution is required. We have, however, found that the activity of the gel can be restored by treating it with an acid, e. g., hydrochloric acid, sulphuric acid, nitric acid, formic acid, acetic acid, oxalic acid, suitably in concentrated form. The choice of acid will be dependent to some extent on the gel employed as obviously it is undesirable to use an acid having considerable solvent action on the gel.

The regeneration of spent silica gel is suitably carried out by merely immersing the material in concentrated hydrochloric acid say of 30% to 40% strength, at normal temperatures or if convenient at somewhat higher temperatures. For practical reasons, due to the tendency to evolve hydrochloric acid gas at elevated temperatures, some inconvenience may be experienced if the temperature is raised too much. This is not important, however, as an adequate treatment for the purposes of regeneration is readily obtained at normal temperatures. The time of the regeneration treatment is likewise not critical. Usually we have found that a contact of about two hours is sufficient though even with a considerably less time an effective regeneration has been obtained in many cases. Also a considerably longer time may be used if this is convenient. After the treatment the acid is separated, e. g., by decantation or filtration, and the gel thoroughly washed with water and finally dried suitably at about 110° C. As is well known it is necessary to observe some care in the heating of adsorbent gels and in the drying stage we find it is necessary to take the normal precautions which are well recognized in this treatment. Thus the drying temperature should not exceed about 300° C. and is preferably kept below 200° C.

We have also found that it is preferable to use a powdered gel rather than the granular form, as thereby a less amount is required to stabilize the same volume of solution, or alternatively, the same weight of powdered gel may be used for longer time without regeneration.

We have not found that the amount of gel which is used in the treatment is critical. That this is so is evident from the repeated use of the same batch of gel for the stabilization of successive batches of solution. At the same time we find that to avoid an undesirably long time of contact it is advisable to use not less than about 5% of gel, calculated on the peroxide present as H₂O₂. Many times this amount may be used with advantage in the treatment of solutions in order to effect a rapid stabilization.

The following examples do not limit the invention but illustrate methods whereby the stabilization of sodium perborate solutions may be carried out, and at the same time indicate the improvement in stability by comparative experiments.

Example 1

An aqueous solution containing 2% by weight of sodium perborate was allowed to stand in contact with granular silica gel for about half an hour at room temperature without agitation, and the clear liquid then decanted off. The stability of the solution was then compared with that of an untreated 2% solution of the same perborate by heating a portion of each solution side by side to 55° C., at the rate of 1° C. per minute, and then determining the amount of undecomposed perborate in each case. It was found that 15.0% of the perborate in the untreated solution had decomposed, while in the treated solution there was only 0.4% decomposition.

Example 2

In this case the strength of solution and manner of treatment were identical with those of Example 1, except that the granular gel had been previously used for the treatment of several batches of perborate solution and had then been regenerated by warming for a short time with concentrated hydrochloric acid, washing and drying at 110° C. A comparison of the stability of the treated solution with that of the untreated solution carried out in the same manner as before, showed that the latter decomposed to the extent of 13.8% and the treated solution 0.6%.

Example 3

This example is designed to show the desirability of using the silica gel in the form of powder.

Two batches of silica gel were used, one granular and the other powdered, for two separate series of successive treatments of 2% sodium perborate solution. In the case of the granular material 95% was retained by a 14 mesh sieve, whereas 94% of the powdered form passed the same sieve. The perborate solution for each treatment was taken from the same stock solution. The method used was to run 300 parts by weight of the solution on to 100 parts by weight of the gel and to leave the two in contact at room temperature for half an hour with slight stirring once every five minutes. The clear liquor was then run off and replaced by a fresh lot which was treated in the same manner. Each batch of gel was used for the treatment of sixteen lots of perborate solution, without regeneration, and the stability of the first and sixteenth solutions treated by both types of material was compared by the same method as was used in Example 1, with the result:

Per cent

First solution from granular gel decomposed to the extent of_____ 0.4
Sixteenth solution from granular gel decomposed to the extent of_____ 5.7
First solution from powdered gel decomposed to the extent of_____ 0.4
Sixteenth solution from powdered gel decomposed to the extent of_____ 1.1

In the above examples instead of silica gel we could have used alumina gel, stannic oxide gel, nickel, oxide gel, or the gels derived from the oxides of thorium, zirconium or titanium.

Besides sodium perborate the invention could also have been used to stabilize other persalts, e. g., percarbonate and peroxides including hydrogen peroxide and metal peroxides such as those of sodium, calcium, barium, strontium, which yield hydrogen peroxide on solution.

As many apparently widely different embodiments of this invention may be made without departing from the spirit and scope thereof, it is to be understood that we do not limit ourselves to the specific embodiments thereof except as defined in the appended claims.

We claim:

1. The method of stabilizing a material selected from the group which consists of hydrogen peroxide and substances which yield hydrogen peroxide when treated with water or with an acid which comprises treating an aqueous solution of said material with silica gel which has been prepared outside of said solution, and then removing said silica gel from said solution.

2. The method of stabilizing a material selected from the group which consists of hydrogen peroxide and substances which yield hydrogen peroxide when treated with water or with an acid which comprises treating an aqueous solution of said material with powdered silica gel which has been prepared outside of said solution, and then removing said powdered silica gel from said solution.

3. The method of stabilizing a material selected from the group which consists of hydrogen peroxide and substances which yield hydrogen peroxide when treated with water or with an acid which comprises treating an aqueous solution of said material with granular silica gel which has been prepared outside of said solution, and then removing said granular silica gel from said solution.

ARTHUR WATSON GOODALL.
OSWALD HUGH WALTERS.